US011230974B2

United States Patent
Camponovo et al.

(10) Patent No.: US 11,230,974 B2
(45) Date of Patent: Jan. 25, 2022

(54) VARIABLE FREQUENCY HELMHOLTZ DAMPERS

(71) Applicant: GENERAL ELECTRIC TECHNOLOGY GMBH, Baden (CH)

(72) Inventors: Simone Roberto Walter Camponovo, Baden (CH); Bruno Schuermans, La Tour-de-Peilz (CH); Fulvio Magni, Nussbaumen (CH)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 15/992,932

(22) Filed: May 30, 2018

(65) Prior Publication Data

US 2018/0363559 A1 Dec. 20, 2018

(30) Foreign Application Priority Data

Jun. 20, 2017 (EP) ..................................... 17176958

(51) Int. Cl.
*F02C 7/24* (2006.01)
*F02C 7/12* (2006.01)

(52) U.S. Cl.
CPC .................. *F02C 7/24* (2013.01); *F02C 7/12* (2013.01); *F05D 2260/213* (2013.01); *F05D 2260/963* (2013.01); *F05D 2270/303* (2013.01); *F05D 2270/3062* (2013.01); *F23R 2900/00014* (2013.01)

(58) Field of Classification Search
CPC ........... F05D 2260/96; F05D 2260/963; F05D 2270/14; F05D 2270/303; F05D 2270/333; F05D 2270/334; F01N 1/023; F23M 20/005
See application file for complete search history.

(56) References Cited

U.S. PATENT DOCUMENTS

| 8,661,822 B2 | 3/2014 | Slobodyanskiy et al. |
| 9,644,846 B2 | 5/2017 | Stevenson et al. |
| 2008/0087019 A1 | 4/2008 | Macquisten et al. |
| (Continued) | | |

FOREIGN PATENT DOCUMENTS

| DE | 196 40 980 A1 | 4/1998 |
| GB | 2 288 660 A | 10/1995 |

OTHER PUBLICATIONS

Selamet et al., Helmholtz resonator with extended neck, Apr. 2003, the Accoustical Society of America, vol. 113, No. 4, Pt. 1, pp. 1975-1983. (Year: 2003).*

(Continued)

*Primary Examiner* — Todd E Manahan
*Assistant Examiner* — Alyson Joan Harrington
(74) *Attorney, Agent, or Firm* — Dority & Manning, P.A.

(57) ABSTRACT

The present application provides a variable frequency Helmholtz damper system for use with a combustor of a gas turbine engine. The variable frequency Helmholtz damper system may include one or more Helmholtz dampers and a purge medium temperature control unit for providing a flow of purge medium to the Helmholtz dampers. The purge medium temperature control unit may be in communication with a temperature control fluid flow such that the purge medium temperature control unit may vary the temperature of the flow of purge medium.

19 Claims, 4 Drawing Sheets

(56) References Cited

U.S. PATENT DOCUMENTS

2008/0216481 A1* 9/2008 Pollarolo ............. F23M 20/005
60/725
2012/0137690 A1* 6/2012 Sardeshmukh ......... F23R 3/002
60/725

OTHER PUBLICATIONS

Extended European Search Report and Opinion issued in connection with corresponding EP Application No. 17176958.1 dated Feb. 23, 2018.

* cited by examiner

VARIABLE FREQUENCY HELMHOLTZ DAMPERS

TECHNICAL FIELD

The present application and resultant patent relate generally to gas turbine engines and more particularly relate to gas turbine engines having a number of variable frequency Helmholtz dampers using temperature to vary the effective damping frequency range.

BACKGROUND OF THE INVENTION

Generally described, gas turbine engines have one or more combustion chambers where a fuel is injected, mixed with an air flow, and combusted to generate high pressure combustion gases. In turn, the high pressure combustion gases are expanded in a turbine to produce mechanical work. During typical operation, pressure oscillations or pulsations may be generated within the combustion chamber. These pulsations are pressure waves that may result from aerodynamic flame instability coupled with a fluctuating heat release. Such pulsations may lead to engine hardware damage and therefore should be avoided. Moreover, such pulsations may limit overall gas turbine output as well as the capability of achieving targeted low emissions, both on fuel gas and fuel oil operation.

For these reasons, the gas turbine combustion chambers may be provided with damping devices, such as Helmholtz dampers and the like, to dampen the pressure oscillations. For example, these traditional Helmholtz dampers may include an enclosure that defines a resonator volume and a neck that may be connected to the combustion chamber. The resonance frequency (i.e., the damped frequency) of the Helmholtz damper may depend on the geometrical features of the resonator volume and the neck. The resonance frequency also must correspond to the frequency of the pressure oscillations generated within the combustion chamber.

The maximum damping capability may be limited by the available volume in which a damper can be implemented. Within a given maximum volume, the Helmholtz dampers may be designed to address critical pulsation frequency ranges. When the pulsation frequency ranges to be damped are too wide and exceed the maximum damping capability that can be obtained from the available volume, the effectiveness of the damper may be compromised. Moreover, when the damper capability is at the limit for a given fuel operation and pulsation characteristics, pulsations resulting from operation with other fuels may not be damped sufficiently. Variable dampers with mechanical components also are known. Such mechanical components, however, may not be practical from a design and lifetime point of view.

SUMMARY OF THE INVENTION

The present application and the resultant patent thus may provide a variable frequency Helmholtz damper system for use with a combustor of a gas turbine engine. The variable frequency Helmholtz damper system may include one or more Helmholtz dampers and a purge medium temperature control unit for providing a flow of purge medium to the Helmholtz dampers. The purge medium temperature control unit may be in communication with a temperature control fluid flow such that the purge medium temperature control unit may vary the temperature of the flow of purge medium delivered to the Helmholtz dampers.

The present application and the resultant patent further provide a method of varying a damping frequency of a Helmholtz damper. The method may include the steps of providing a flow of purge medium to a purge medium temperature control unit, providing a flow of a temperature control fluid to the purge medium temperature control unit, varying a temperature of the flow of purge medium in the purge medium temperature control unit with the flow of the temperature control fluid, and providing the flow of purge medium to the Helmholtz damper.

The present application and the resultant patent further provide a variable frequency Helmholtz damper system for use with a combustor of a gas turbine engine. The variable frequency Helmholtz damper system may include one or more variable frequency Helmholtz dampers and a purge medium temperature control unit for providing a flow of purge medium to the variable frequency Helmholtz dampers. The purge medium temperature control unit may be in communication with a temperature control fluid flow such that the purge medium temperature control unit may vary the temperature of the flow of purge medium so as to vary a damping frequency of the variable frequency Helmholtz dampers.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
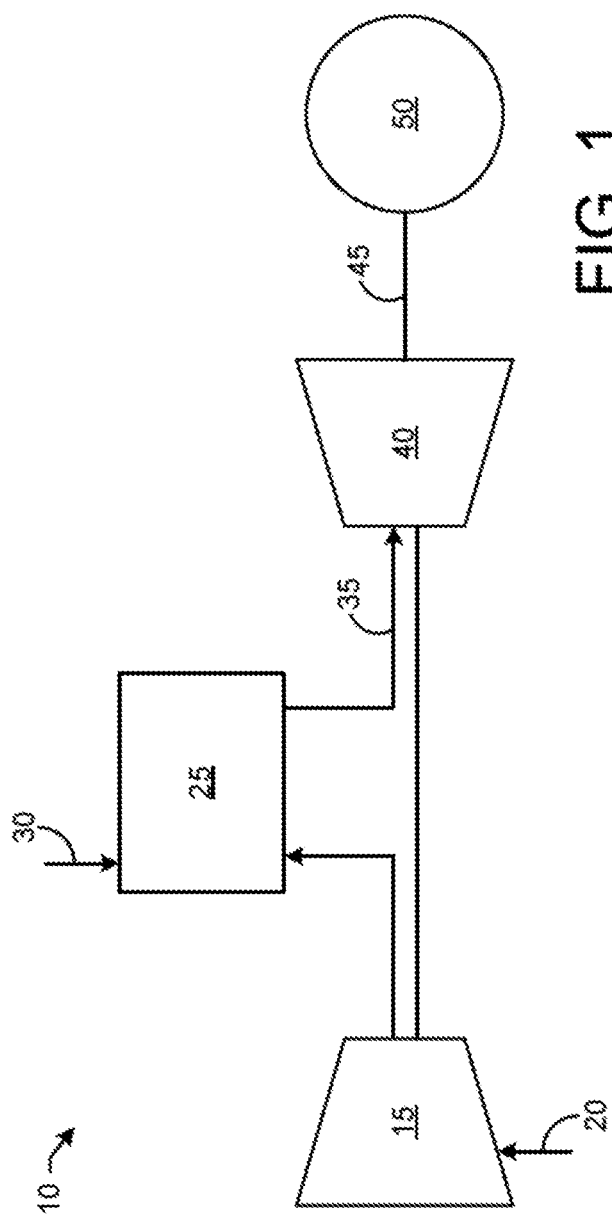
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 configured in a circumferential or sequential array and the like. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y. and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
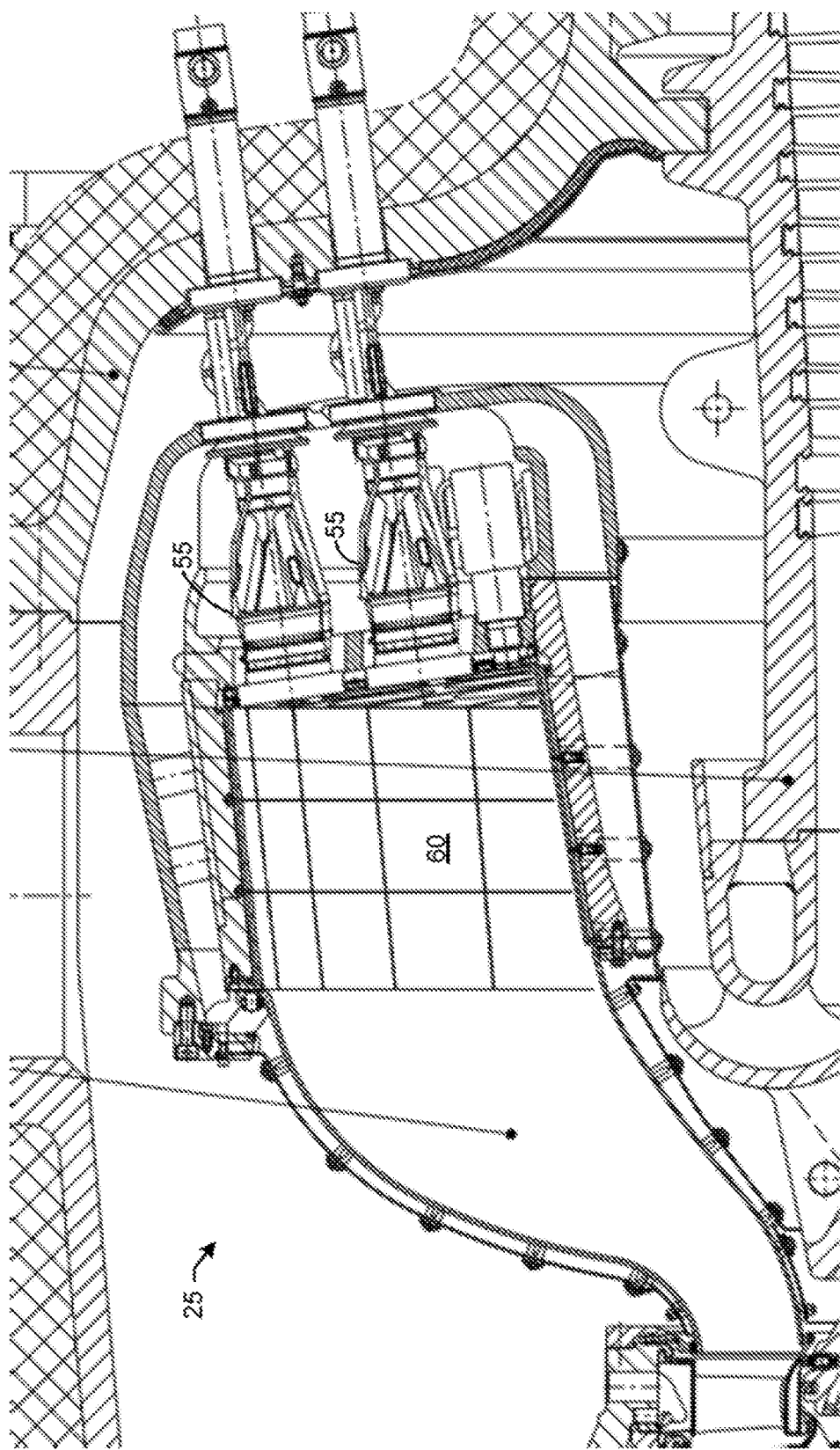
FIG. 2 is a partial sectional view of a combustor that may be used with the gas turbine engine of FIG. 1.

FIG. 2 is a partial sectional view of an example of the combustor 25 that may be used with the gas turbine engine 10. The combustor 25 may include a number of burners 55 positioned in the annular array. The burners 55 may be in communication with the flow of air 20 and the flow of fuel 30 to produce the flow of the combustion gases 35 in a downstream combustion zone 60. The combustor 25 shown herein is for the purpose of example only. Many other types of combustors and combustor components may be used herein.

Figure 3:
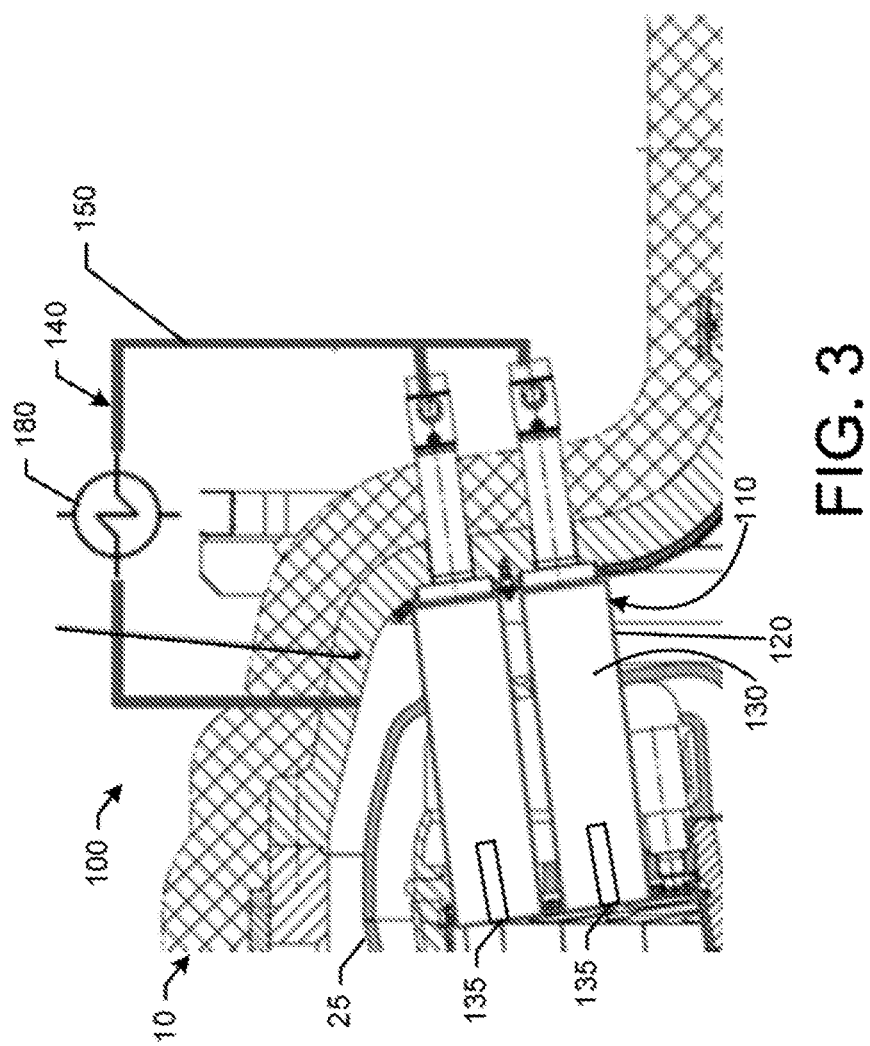
FIG. 3 is a schematic diagram of a variable frequency Helmholtz damper system as may be described herein.
Figure 4:
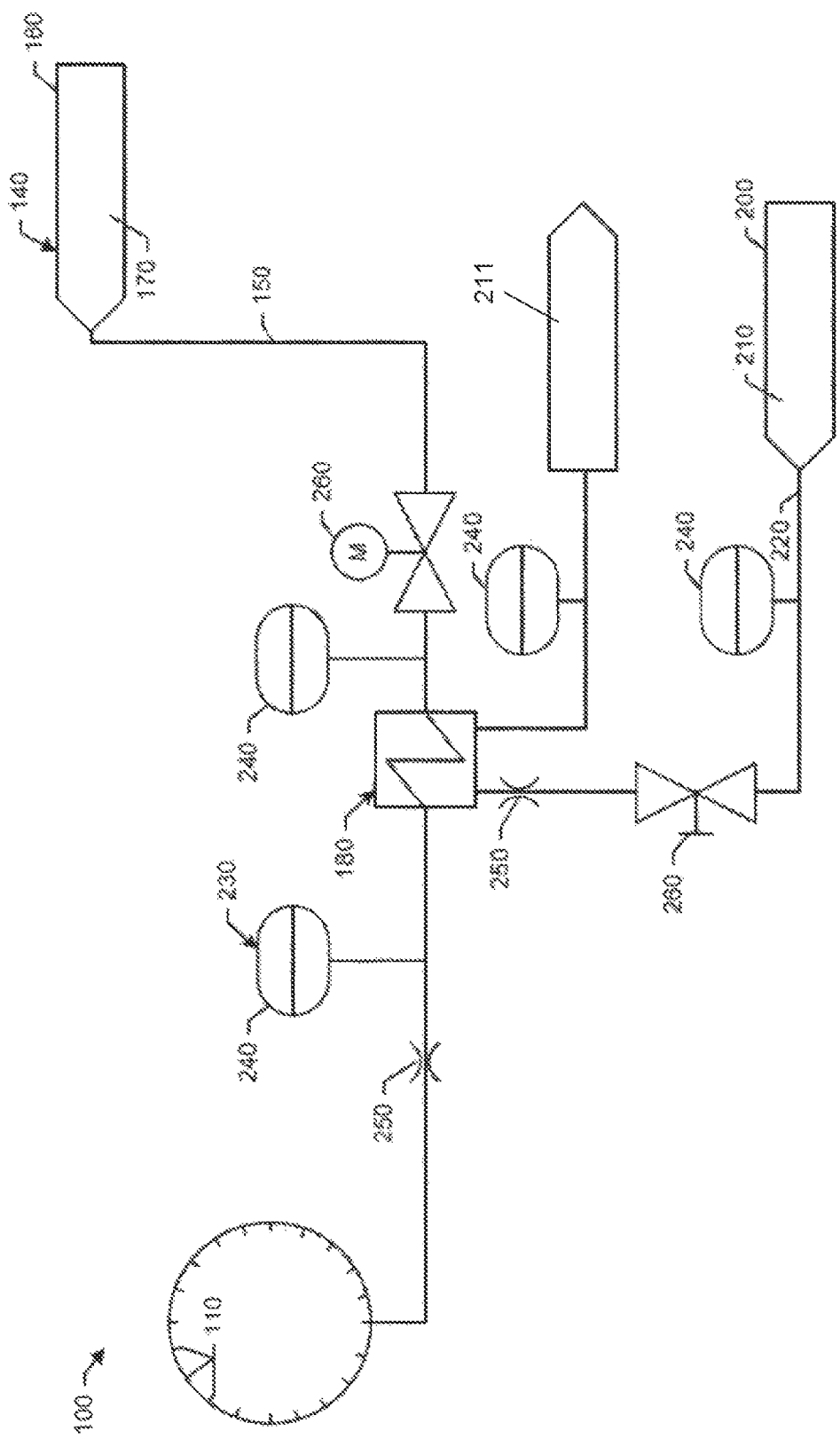
FIG. 4 is a further schematic diagram of the variable frequency Helmholtz damper system of FIG. 3.

FIGS. 3 and 4 show an example of a variable frequency Helmholtz damping system 100 as may be described herein. The variable frequency Helmholtz damping system 100 may include any number of variable frequency Helmholtz dampers 110. The variable frequency Helmholtz dampers 110 may be positioned in an annular array about the burners 55. Any number of variable frequency Helmholtz dampers 110 may be used herein. Each variable frequency Helmholtz damper 110 may include a cylinder 120 that defines a volume 130 therein. The geometry of the cylinder 120, the volume 130, and the neck 135 have an impact on the effective damping range of the variable frequency Helmholtz dampers 110. Cylinders 130 with the same or a different volume may be used herein. The cylinders 130 may have any suitable size, shape, or configuration. Other components and other configurations may be used herein.

The variable frequency Helmholtz damping system 100 may include a purge medium system 140. The purge medium system 140 may include a number of purge medium lines 150. The purge medium lines 150 may be in communication with the cylinder 120 of each variable frequency Helmholtz damper 110 and a purge medium source 160. The purge medium source 160 may include a volume of compressed purge medium 170 therein. The purge medium 170 may be air, steam, or other types of mediums. The purge medium 170 may come from the compressor 15 or from any convenient source. Other components and other configurations may be used herein.

The variable frequency Helmholtz damping system 100 may include a purge medium temperature control unit 180. The purge medium temperature control unit 180 may vary the temperature of the flow of the purge medium 170 delivered to the Helmholtz dampers 110, e.g., by means of heat exchange and/or mixing the two fluids. The purge medium temperature control unit 180 may be a conventional fluid to gas heat exchanger and may have any suitable size, shape, configuration, or capacity. Other types of heat exchangers may be used herein such as gas to gas, gas to liquid, evaporative, and the like. The purge medium temperature control unit 180 may include a cooling fluid source 200 with a flow of a temperature control fluid 210 and a cooling fluid return 211. The temperature control fluid 210 may be any type of suitable heat exchange fluid such as water, steam, and the like. The cooling fluid source 200 may be in communication with the purge medium temperature control unit 180 via a cooling fluid line 220. The temperature control fluid 210 may exchange heat with the purge medium 170 in the purge medium temperature control unit 180. The temperature of the purge medium 170 thus may be varied as desired via the purge medium temperature control unit 180. Although the purge medium temperature control unit 180 has been described in the context of cooling the variable frequency Helmholtz damper 110, the purge medium temperature control unit 180 may control the temperature of the purge medium 170 in any circumstances including raising the temperature if desired.

The purge medium temperature control unit 180 also may include a number of flow measurement and control devices 230. The flow measurement and control devices 230 may include temperature sensors 240, flow meters 250, valves 260, and the like. The flow measurement and control devices 230 may be of conventional design. The flow measurement and control devices 230 may be operated via a conventional controller. The controller may be any type of programmable logic device. Other components and other configurations may be used herein.

In use, the variable frequency Helmholtz damping system 100 may vary the temperature of the purge medium 170 via the purge medium temperature control unit 180. Specifically, given the different frequency ranges that may be expected for fuel gas and fuel oil operation, the purge medium temperature may be varied. The damping frequency changes with the speed of sound such that temperature is a parameter that can be used to tune the variable frequency Helmholtz dampers 110. The change in the internal temperature in the variable frequency Helmholtz damping system 100 thus may control and vary the damping frequency such that the system may address both fuel gas and fuel oil pulsations with a limited total volume. The gas turbine engine 10 therefore will be able to operate on different fuels within acceptable pulsation levels. The risks linked to early performance degradation or hardware failure thus may be mitigated so as to increase the overall availability of the gas turbine engine 10.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

The invention claimed is:

1. A variable frequency Helmholtz damper system comprising:
   a gas turbine combustor;
   one or more Helmholtz dampers for use with the gas turbine combustor, wherein the one or more Helmholtz dampers each comprise a cylinder defining a volume therein, and wherein a neck is disposed within the volume;
   a purge medium line that provides a flow of purge medium to the volume of the cylinder of each of the one or more Helmholtz dampers;
   a cooling fluid line extending from a cooling fluid source to a cooling fluid return for conveying a temperature control fluid;
   a purge medium temperature control unit fluidly coupled to the cooling fluid line between the cooling fluid source and the cooling fluid return, wherein the purge medium temperature control unit is positioned on the purge medium line outside of the gas turbine combustor, and wherein the purge medium temperature control unit varies a temperature of the flow of purge medium.

2. The variable frequency Helmholtz damper system of claim 1, wherein the one or more Helmholtz dampers comprise one or more variable frequency Helmholtz dampers.

3. The variable frequency Helmholtz damper system of claim 2, wherein the one or more variable frequency Helmholtz dampers comprise a plurality of damping frequencies.

4. The variable frequency Helmholtz damper system of claim 1, wherein the purge medium temperature control unit is in communication with the purge medium flow and the temperature control fluid flow.

5. The variable frequency Helmholtz damper system of claim 1, wherein the purge medium temperature control unit comprises a liquid to gas, gas to gas, or evaporative heat exchanger.

6. The variable frequency Helmholtz damper system of claim 1, wherein the purge medium temperature control unit comprises a purge medium source in fluid communication with the purge medium line.

7. The variable frequency Helmholtz damper system of claim 6, wherein the purge medium source comprises a compressor.

8. The variable frequency Helmholtz damper system of claim 1, wherein the purge medium temperature control unit comprises a plurality of flow measurement and control devices.

9. The variable frequency Helmholtz damper system of claim 8, wherein the plurality of flow measurement and control devices comprises a temperature sensor.

10. The variable frequency Helmholtz damper system of claim 8, wherein the plurality of flow measurement and control devices comprises a flow meter.

11. The variable frequency Helmholtz damper system of claim 8, wherein the plurality of flow measurement and control devices comprises a plurality of valves.

12. The variable frequency Helmholtz damper system of claim 1, wherein the purge medium temperature control unit varies a damping frequency of the one or more of Helmholtz dampers.

13. A method of varying a damping frequency of a Helmholtz damper, comprising:
providing, with a purge medium line, a flow of purge medium to a purge medium temperature control unit;
providing the flow of purge medium to the Helmholtz damper, wherein the Helmholtz damper extends at least partially into a gas turbine combustor, and wherein the Helmholtz damper comprises a cylinder defining a volume therein, and wherein a neck is disposed within the volume;
providing, with a cooling fluid line, a flow of a temperature control fluid to the purge medium temperature control unit wherein the purge medium temperature control unit is fluidly coupled to the cooling fluid line between a cooling fluid source and a cooling fluid return, and wherein the purge medium temperature control unit is positioned on the purge medium line outside of the gas turbine combustor; and
varying a temperature of the flow of purge medium in the purge medium temperature control unit with the flow of the temperature control fluid, whereby an internal temperature of the Helmholtz damper is changed thereby varying the damping frequency of the Helmholtz damper.

14. A variable frequency Helmholtz damper system, comprising:
one or more variable frequency Helmholtz dampers for use with a gas turbine combustor, wherein the one or more variable frequency Helmholtz dampers each comprise a cylinder defining a volume therein, and wherein a neck is disposed within the volume;
a purge medium line that provides a flow of purge medium to the volume of the cylinder of each of the one or more Helmholtz dampers;
a cooling fluid line extending from a cooling fluid source to a cooling fluid return for conveying a temperature control fluid;
a purge medium temperature control unit fluidly coupled to the cooling fluid line between the cooling fluid source and the cooling fluid return, wherein the purge medium temperature control unit is positioned on the purge medium line outside of the gas turbine combustor, and wherein the purge medium temperature control unit varies a temperature of the flow of purge medium so as to vary a damping frequency of the one or more variable frequency Helmholtz dampers.

15. The variable frequency Helmholtz damper system of claim 14, wherein the purge medium temperature control unit comprises a liquid to gas, gas to gas, or evaporative heat exchanger.

16. The variable frequency Helmholtz damper system of claim 14, wherein the purge medium temperature control unit comprises a plurality of flow measurement and control devices.

17. The variable frequency Helmholtz damper system of claim 1, wherein the purge medium line is fluidly coupled to the purge medium source and directly fluidly coupled to the one or more Helmholtz dampers.

18. The variable frequency Helmholtz damper system of claim 1, wherein the combustor includes burners positioned in a first annular array, and wherein a plurality of variable frequency Helmholtz dampers including the one or more variable frequency Helmholtz dampers is positioned in a second annular array about the burners.

19. The variable frequency Helmholtz damper system of claim 14, further comprising a compressor discharge casing that defines a high pressure plenum, the gas turbine combustor disposed in the high pressure plenum, and wherein the temperature medium control unit is disposed outside the high pressure plenum.

* * * * *